US007118056B2

(12) United States Patent
Domanico

(10) Patent No.: US 7,118,056 B2

(45) **Date of Patent: *Oct. 10, 2006**

(54) FLUORESCENT LAMP DISPOSAL SYSTEM

(75) Inventor: Edward J. Domanico, Fort Lauderdale, FL (US)

(73) Assignee: Killgerm Group Limited, West Yorkshire (GB)

( * ) Notice: Subject to any disclaimer, the term of this patent is extended or adjusted under 35 U.S.C. 154(b) by 18 days.

This patent is subject to a terminal disclaimer.

(21) Appl. No.: 10/799,350

(22) Filed: Mar. 12, 2004

(65) Prior Publication Data

US 2005/0145730 A1 Jul. 7, 2005

Related U.S. Application Data

(63) Continuation-in-part of application No. 10/330,814, filed on Dec. 27, 2002, which is a continuation of application No. 09/540,410, filed on Mar. 31, 2000, now abandoned.

(60) Provisional application No. 60/127,381, filed on Apr. 1, 1999.

(51) Int. Cl.
*B02C 19/00* (2006.01)
*A01F 21/00* (2006.01)

(52) U.S. Cl. ........................................ 241/99; 241/37.5

(58) Field of Classification Search .................. 241/99, 241/36, 37.5, 100, DIG. 14
See application file for complete search history.

(56) References Cited

U.S. PATENT DOCUMENTS

| | | | | | |
|---|---|---|---|---|---|
| 4,655,404 | A | * | 4/1987 | Deklerow | 241/99 |
| 5,092,527 | A | * | 3/1992 | Perry et al. | 241/19 |
| 5,205,497 | A | * | 4/1993 | Deklerow | 241/36 |
| 5,575,429 | A | * | 11/1996 | Muller-Girard | 241/36 |
| 5,743,473 | A | * | 4/1998 | Gregg | 241/33 |
| 5,769,336 | A | * | 6/1998 | Emmerson | 241/36 |
| 5,899,395 | A | * | 5/1999 | Deklerow | 241/36 |

* cited by examiner

*Primary Examiner*—Faye Francis
(74) *Attorney, Agent, or Firm*—Daniel S. Polley, P.A.

(57) ABSTRACT

A chemical waste collection and disposal system for fluorescent lamps that allows for the safe collection and disposal of crushed or broken fluorescent lamps, while recovering substantially 100% of the hazardous mercury vapors contained within the lamps. A fluorescent lamp is inserted within a drum and broken into fragments by one or more blades, with the fragment falling to the bottom of the drum. The mercury vapors that are emitted from the broken fluorescent lamps are forced out of the drum by negative positive pressure created by a vacuum/filter assembly. Once through the filter assembly, which includes a HEPA filter and activated carbon filter, the gases are permitted to escape into the environment virtually 100% free of mercury toxins.

19 Claims, 4 Drawing Sheets

FLUORESCENT LAMP DISPOSAL SYSTEM

This application is a continuation-in-part of U.S. application Ser. No. 10/330,814, filed Dec. 27, 2002, which is a continuation of U.S. application Ser. No. 09/540,410, filed Mar. 31, 2000 now abandoned, which claims priority to and the benefit of U.S. application No. 60/127,381, filed Apr. 1, 1999, all of the above-identified applications are incorporated by reference.

BACKGROUND OF THE INVENTION

This invention relates generally to the collection, storage and disposal of chemical wastes, especially upon cruise and cargo vessels, and particularly to the collection, storage and disposal of fluorescent lamps and the recovery of mercury vapors emitted from said fluorescent lamps.

There are several problems associated with the collection and disposal of fluorescent lamps, which generate waste on ships and upon large ships in general. The operators, i.e., ship employees, of on-board chemical waste collection and disposal systems are often unknowledgeable about the proper use of present-day waste collection systems. Such operators are typically not aware of procedures for safe and code compliance handling of the waste and, therefore are not able to properly handle storage, movement, leakage or spillage of chemical waste.

Further, the common practice for ship employees to dispose of fluorescent lamps does not include the use of on-board chemical waste collection and disposal systems. Instead, the common practice is to dispose the fluorescent lamps with common non-chemical waste. This procedure results in the breakage of the fluorescent lamps and allows mercury vapors to emit from the fluorescent lamps and contaminate the immediate area thereby possibly intoxicating the ship employees' work area and also possibly causing serious health and safety violations.

The Occupational Safety and Health Administration (OSHA) has set Permissible Exposure Limits (PEL) for the number of air contaminants in the Code of Federal Regulations for Labor and Industry (29 CFR 1910.1000). The PEL's are based upon an 8-hour Time Weighted Average (TWA) concentration. An employees' exposure to a substance for an 8-hour work shift of a 40-hour work week should not exceed the 8-hour TWA PEL for that substance. For substances with a Ceiling Limit, the concentration shall not exceed that limit at any time during the working exposure. For Mercury, the OSHA PEL is, 0.1 mg/m3 (C) pursuant to 29 C.F.R. 1910.1000 (z) (2).

As such, it is highly desirous to provide a chemical waste collection, storage and disposal system for the safe handling of fluorescent lamps upon their useful life ending.

It is therefore, to the effective resolution of the aforementioned problems and shortcomings that the present invention is directed.

SUMMARY OF THE INVENTION

The present invention provides a chemical waste collection and disposal system for fluorescent lamps which preferably includes a drum or container such as a 55-gallon Department of Transportation (D.O.T.) standard drum, a drum lid assembly with handles at the top thereof, a bottom, an interior hollow volume, a fixed lamp tube on the drum-lid for entry of fluorescent lamp tubes, a motor assembly attached on the drum-lid, a vacuum/filter unit attached on the side of the drum preferably near the top, and a filter located at the exterior of the side near the top of the drum.

The lamp disposal system can be preferably mounted on the drum to allow for the safe collection and disposal of properly crushed fluorescent lamps, while recovering approximately 100% or at least a substantial amount of the hazardous mercury vapors. Any length or shape of fluorescent lamps can be disposed of, such as standard one inch and four or eight foot lamps and u-shaped lamps. Where a standard 55-gallon drum is used, the present invention can dispose of approximately 600 four foot lamps, though such number is not limiting. Thus, the present invention may be utilized to safely collect and store any length fluorescent lamp, including standard 4 and 8-foot lamps, 1" lamps and other shapes of lamps.

In use, a fluorescent lamp is inserted into an opening of the fixed lamp tube assembly or other lamp feeder, preferably located at the top of the tube disposal system. Upon reaching the bottom opening of the fixed lamp tube or feeder, the fluorescent lamp is met by a spinner assembly or the like, that is driven by a motor assembly. Rotating at a sufficient amount of revolutions per second, one or more blades of the spinner assembly, breaks the fluorescent lamp into fragments that collect at the bottom of the drum.

At least a substantial amount, and preferably approximately 100%, of the mercury vapors that are emitted from the broken fluorescent lamps are preferably forced out of the drum with positive pressure created by the vacuum/filter assembly. Once through the vacuum/filter assembly, the vapors exit said vacuum/filter assembly and preferably enter an activated carbon filter, other filtering assembly, or the like. Upon the gases and vapors filtering through the activated carbon filter, they escape out of a vent member virtually 100% free of mercury toxins, as the toxins remain with the carbon filter.

The controls of the instant invention allow for fluorescent lamps to be safely disposed of while maintaining concentrations of mercury within the ceiling limit established by OSHA. Preferably, one lamp is inserted through the assembly at a time. However, it is considered within the scope of the invention to inserted more than one lamp through the assembly (i.e. through a plurality of tube feeders are a single tube feeder sufficient in size to receive more than one lamp at a time. In such alternative embodiment, the size of the components such as the tube assembly will be adjusted accordingly. It is also within the scope of the invention, to use the present invention for the disposal of other potential hazardous objects, such as but not limited to, other lamps and bulbs. With these alternative uses, certain components like the activated carbon may be replaced, where applicable, with a more appropriate chemical needed for neutralizing or retaining the additional hazardous material, which may not be mercury.

Thus, the present invention provides a chemical waste collection and disposal system for fluorescent lamps which preferably includes a 55-gallon drum having a drum lid assembly, a fixed lamp tube on the drum-lid for entry of fluorescent lamp tubes, a motor assembly attached on the drum-lid, a vacuum/filter unit attached on the side of the drum preferably near the top, and a filter located at the exterior of the side near the top of the drum. The system allows for the safe collection and disposal of crushed or broken fluorescent lamps, while recovering substantially 100% of the hazardous mercury vapors contained within the lamps. Any length fluorescent lamps can be disposed of, such as standard one inch and four or eight foot lamps. In use, a fluorescent lamp is inserted into an opening of the fixed lamp tube assembly. Upon reaching the bottom opening of the fixed lamp tube, the fluorescent lamp is met by a spinner assembly that is driven by a motor assembly. Rotating at a sufficient amount of revolutions per second, one or more blades of the spinner assembly break the fluorescent lamp into fragments that collect at the bottom of the drum. The mercury vapors that are emitted from the broken fluorescent lamps are preferably forced out of the drum with positive pressure created by the vacuum/filter assembly. Once through the vacuum/filter assembly, the vapors exit said vacuum/filter assembly and preferably enter an activated carbon filter or the like. Upon the gases and vapors filtering through the activated carbon filter, they escape out of a vent member virtually 100% free of mercury toxins, as the toxins remain with the carbon filter.

Generally summarizing, the present invention, which can be considered a bulb or lamp compactor can consist of three main components: (1) a bulb breaking or crushing assembly, (2) a vapor filtering assembly, such as a mercury vapor filter assembly; and (3) a waste collection drum or container. The crushing assembly is preferably mounted directly at the top of the collection drum by the drum lid portion of the crushing assembly. A sealing member, such as a rubber gasket, can be provided to form a seal at the connection point between the drum lid and the collection drum. The crushing assembly also include a motor mounted on top of the drum lid with a shaft connected at one end to the motor and extending through the drum lid, by a preferably sealed opening, such that its second end having one or more blades attached thereto is located within the drum for breaking or crushing inserted bulbs, lamps, etc. (collectively referred to throughout the specification and claims as either “bulbs” or “lamps”).

Two openings can be provided for the insertion of the bulbs. The first opening is through a fixed tube feeder, with or without an extension, which is preferably for feeding various lengths of linear fluorescent bulbs. The second opening preferably consists of a box-like or rectangular opening shaped member for feeding circline, u-shaped, and other non-linear shaped bulb. Preferably, both of the bulb openings can be sealed when not in use.

The filtering assembly can be attached to the drum by any conventional removable or non-removable attachment manner such as but by brackets, hooks, welding, bands, etc. and all are considered within the scope of the invention. In one embodiment the filter assembly can be physically supported at the top of the drum or drum lid by a bracket member, such as, but not limited to, a metal bracket. Preferably, the filter assembly consists of multi-stage filter members. A hose member or other conduit, preferably flexible, can be attached at one end to the drum lid (to form a sealed connection) such that it is able to draw in air and mercury vapors from broken bulbs. The opposite end of the hose is communication with the filter member for the first stage of the multi stage filtering process. When the motor of the filter assembly is turned on, a vacuum is created (negative pressure), causing air and vapors residing in the drum to travel through the hose and into the filter assembly. Once passing through the series of filters clean and safe air is expelled out of openings in the filter assembly.

The hose member can be a vacuum hose such as, but not limited to an approximately 2" diameter plastic accordion vacuum hose. A pressure gauge can be provided, preferably on the drum-lid, for reading or measuring the pressure level or extent of vacuum created in the drum. A low reading on the gauge may indicate a clog or other possible problems with one or more of the filter members or the hose or the possibility of leak in the crushing unit or drum. In either embodiment, the present invention can be tilted, such as but not limited to an approximately 45 degree angle, through the use of a specially design dolly, which will allow long linear tubes to be fed into the machine without hitting or otherwise interfering with the ceiling of a room where the present invention may be located.

Accordingly, it is an object of the present invention to provide a chemical waste collection and disposal system which is easily operable by a crew aboard a cruise or large ship.

It is another object to provide a chemical waste storage and disposal system which allows for safe and code compliance storage of chemical waste.

It is a yet further object to provide a chemical waste and storage system which is easily transportable off ship for removal and disposal.

It is a yet further object to provide a chemical waste and storage system which is easily movable from drum to drum.

It is a further object of the invention to allow for the safe collection and disposal of fluorescent lamps.

It is still another object of the invention to provide a chemical waste and disposal system in which mercury particles and vapors that are emitted from fluorescent lamps are safely contained upon disposal.

It is a yet further object to provide for the economical transport of chemical waste in unit quantities as close to 55 gallons as possible, for cost-effective operation of the system.

The above and yet further objects and advantages of the present inventive system will become apparent from hereinafter set forth Brief Description of the Drawings and Detailed Description of the Invention.

BRIEF DESCRIPTION OF THE DRAWINGS

The invention may be better understood by reference to the drawings in which.

DETAILED DESCRIPTION OF THE DRAWINGS

Figure 1:
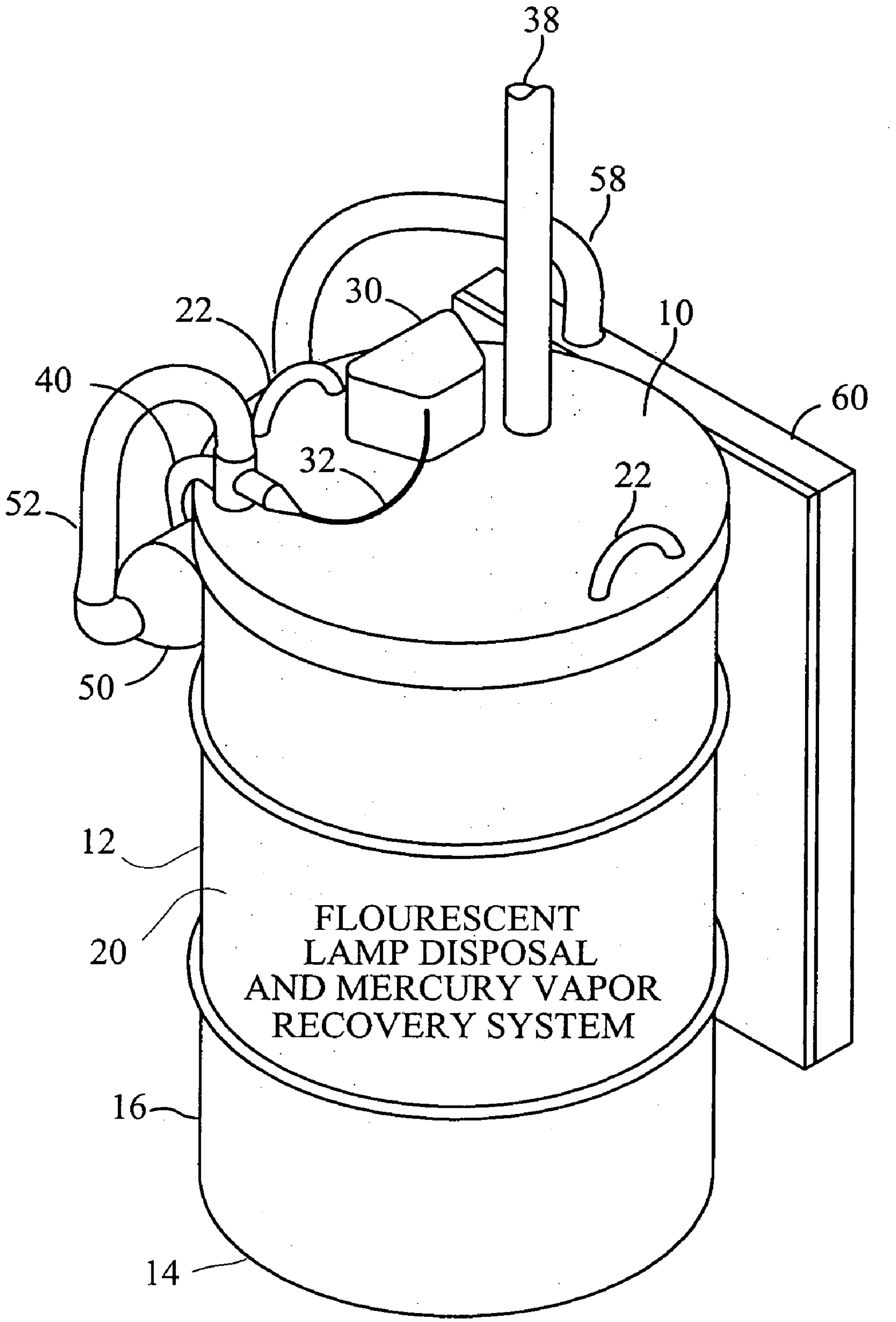
FIG. 1 is a perspective view of a first embodiment of the present invention chemical waste collection, storage and disposal system.

The first embodiment of the instant chemical waste collection and disposal system, as is illustrated in FIG. 1, can comprise a drum lid assembly 10, mounted preferably on a drum or other housing, such as a 55-gallon D.O.T. standard drum 20, having a drum bottom 14, a drum exterior 12, and a drum interior hollow volume 16. The drum-lid assembly 10, includes at least one handle and preferably two handles 22, and a fixed lamp tube 38, preferably shaped to correspond to the shape of the fluorescent lamps, or other items, to be inserted.

Figure 3:
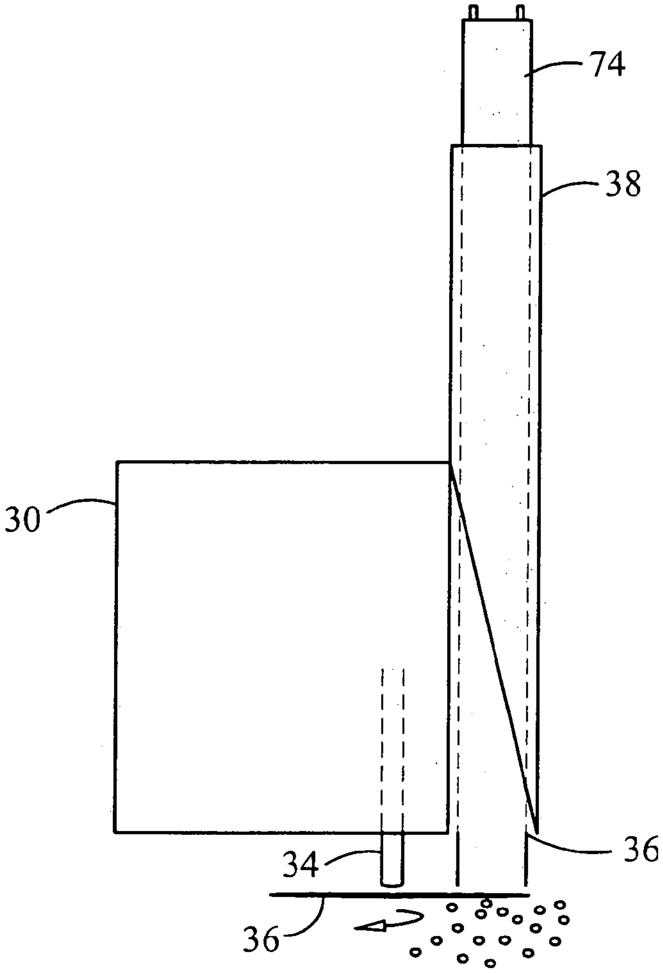
FIG. 3 is a side plan view of FIG. 1, illustrating a motor assembly and a fixed lamp tube.

The fixed lamp tube 38, is preferably adjacent to a motor assembly 30. Motor assembly 30 may be of a 120V or 220V configuration and powered by an electrical cord, other power configurations including battery power are also within the scope of the invention. As illustrated in FIG. 3, the fixed lamp tube 38, preferably has an opening at the top to allow for a fluorescent lamp 70 to be inserted preferably vertically into the opening. Upon reaching the bottom opening of fixed lamp tube 38, the fluorescent lamp is met by a spinner assembly 36, connected to a shaft 34, which is driven by a motor assembly 30. Rotating at a sufficient amount of revolutions per second, the blades of spinner assembly 36, break the fluorescent lamp into fragments that fall to the bottom of the drum, through an opening in the drum cover or lid.

As illustrated in FIG. 1, the mercury vapors that are emitted from the broken fluorescent lamps may be drawn out of the 55-gallon drum by a positive pressure created by the mercury vapor recovery system that features a high-efficiency vacuum system 50, through flexible hose 52. Vacuum/filter assembly 50 is preferably attached to the 55-gallon drum by a bracket 40. The high efficiency vacuum system 50 preferably includes a specially treated H.E.P.A. filter that captures virtually 100% of the mercury, contaminated white powder, considered hazardous. It should be recognized that other appropriate conventional filters can also be used and are considered within the scope of the invention. Preferably, the filters are replaced periodically.

Figure 2:
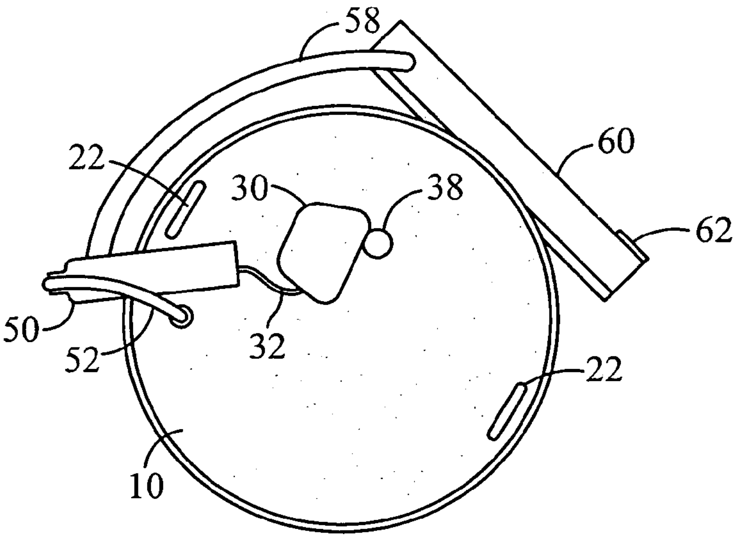
FIG. 2 is a top view of the embodiment illustrated in FIG. 1.

As illustrated in FIG. 2, once drawn through vacuum/filter assembly 50, the vapors then exit the vacuum/filter assembly through flexible hose 58 and then preferably enter a specially treated activated carbon filtering system 60 for final hazardous mercury vapor removal. Other conventional filtering systems can also be used and are considered within the scope of the invention. Upon the gases and vapors filtering through activated carbon filter 60, they are exhausted out of a vent 62 as uncontaminated air, free of harmful mercury toxins, which are retained or neutralized by the filter.

Figure 4:
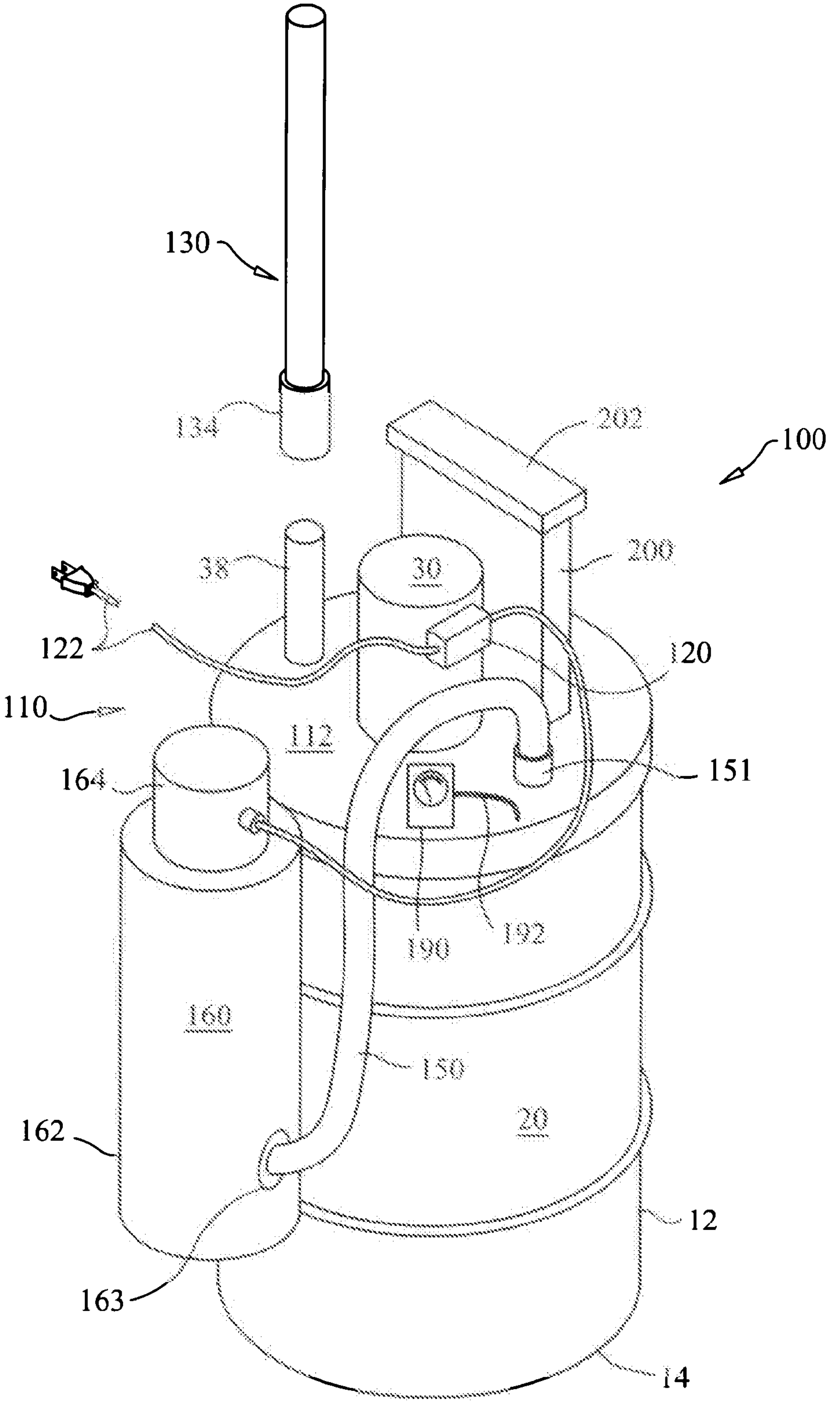
FIG. 4 is a perspective view of a second embodiment of the present invention chemical waste collection, storage and disposal system.
Figure 5:
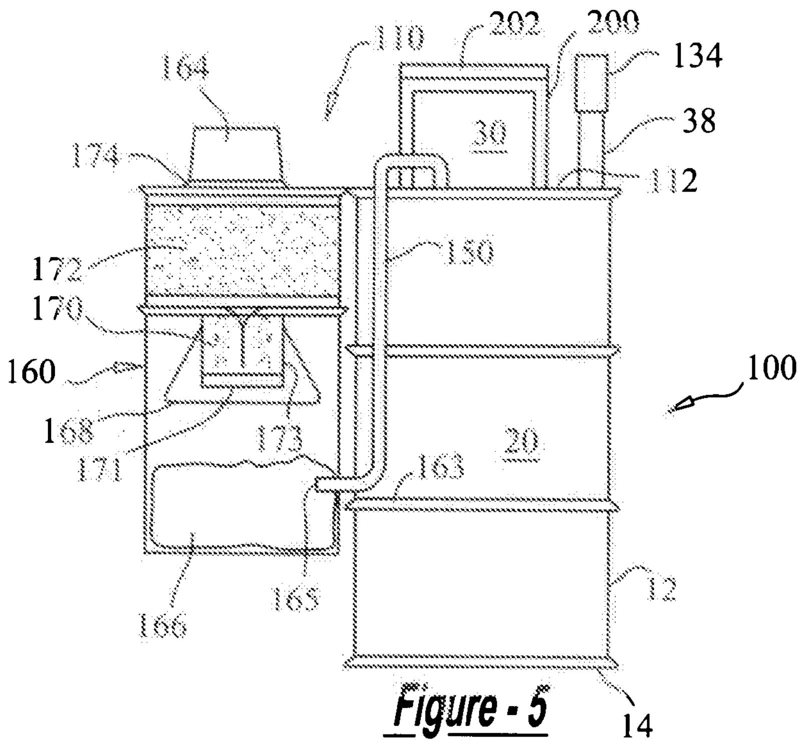
FIG. 5 is a side view of the invention shown in FIG. 4 with a portion of the filtering assembly housing cutaway or section to illustrated the multi-stage filtering members.
Figure 6:
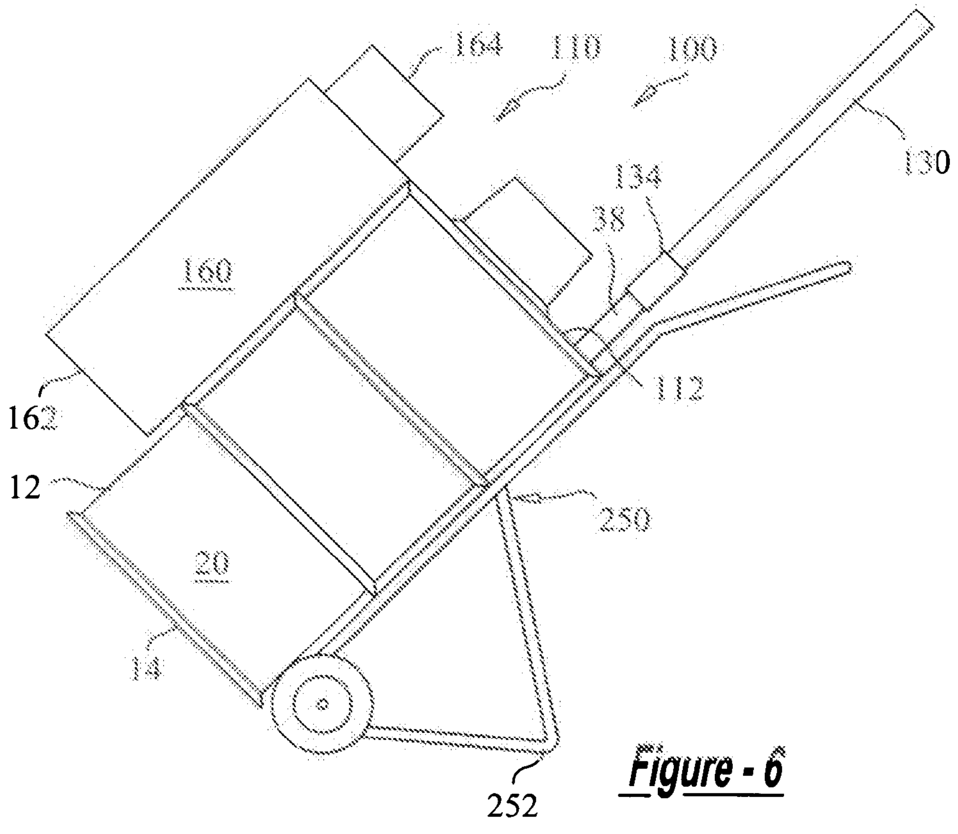
FIG. 6 is a side view of the invention shown in FIG. 4 shown in an inclined position.

The present invention, in the first embodiment includes the following parts and components, namely:

I. Main Drum-Lid Assembly
(a) lid, with fixed lamp tube
(b) lamp tube, loose, with funnel top
(c) lid handle, (2), with ¼-20×1" and 2" screws and locknuts II. Motor Assembly
(a) motor, replacement, 120v, with top disk, washers, locknuts, switch, no cords
(b) motor, replacement, 120v, with top disk, washers, locknuts, switch, short and long cords
(c) motor, replacement, 120/220v, with top disk, washers, locknuts, switch, no cords
(d) motor, replacement, 120/220v, with top disk, washers, locknuts, switch, short and long cords
(e) spinner assembly, with hub, cable, and set screws
(f) power cord, 18-3 SJT, 40' with wire nuts and strain relief
(g) cord, short, to vacuum filter section cable and connector (6" cord)
(h) switch, on-off toggle switch, with nuts and legend plate, wire nuts III. Filter/Vacuum Section
(a) vacuum unit, with connectorized cord and screws for mounting to bracket.
(b) vacuum mounting bracket
(c) bracket mounting spacers, (3), ¾ diameter×1"
(d) hose, inlet replacement, with tapered end piece
(e) hose, outlet replacement, with tapered end piece
(f) hose grommets, (2), for lid and carbon canister
(g) filter bags, disposable pre-filters, set of 5
(h) HEPA final filter, cartridge, each
(i) end plates, molded, inlet
(j) end plates, molded, outlet
(k) decal on the filter/vacuum unit IV. VRS/Carbon Canister Section
(a) carbon canister, without lid/top plate
(b) canister lid/top plate, with screws (5), ¼-20×¾ truss head
(c) foam gasket and 425 canister pad
(d) carbon, activated, 22 pounds
(e) snap-in handle
(f) standoff, mounting for canister, with screws
(g) trim, bottom edge V. Miscellaneous
(a) safety goggles
(b) gloves, lamp handling As seen in FIGS. 4 through 6, a second embodiment for the present invention is shown and generally illustrated as chemical waste collection and disposal system 100. Like or similar parts from the first embodiment discussed above will be provided with the same reference numerals. Disposal system 100 includes a waste removal assembly 110, mounted preferably on a drum or other housing, such as a 55-gallon D.O.T. standard drum 20, having a drum bottom 14, a drum exterior surface or sidewall 12, and a drum interior hollow volume 16. A drum lid 112 is provided and can include at least one handle and preferably two handles. A fixed lamp tube 38, preferably shaped to correspond to the shape of the fluorescent lamps, or other items, to be inserted can be provided on drum lid 112. Drum lid 112 can be removably secured to drum 20 at the top of the drum 20. Preferably a gasket or other sealing member is provided to create a sealed removable connection between drum lid 112 and drum 20.

Fixed lamp tube 38 can be preferably adjacent to a motor assembly 30. Motor assembly 30 may be of a 110V–120V or 220V configuration, other value and includes a power assembly 120 having an electrical cord 122 for plugging into a wall plug or other power outlet. Other power configurations including, but not limited to, battery and solar power are also within the scope of the invention.

As illustrated in FIG. 4, fixed lamp tube 38 preferably is provided with a top opening and a bottom opening. The top opening allows a fluorescent lamp 70 to be inserted preferably vertically or angled (FIG. 6) into lamp insertion tube 38. Upon reaching the bottom opening of fixed lamp tube 38, fluorescent lamp 70 is permitted to enter the interior of drum 20 and is ultimately met by spinner assembly 36, connected to shaft 34, which is driven by motor assembly 30. Rotating at a sufficient amount of revolutions per second, the blade or blades of spinner assembly 36, break and/or crush fluorescent lamp 70 into fragments that for the most part fall (i.e. a small amount may enter the filter assembly and captured by one of the filter members) to the bottom of the drum. Fixed lamp tube 38 can be connected to drum lid 112 by any conventional means. Fixed lamp tube 38 can be monolithically formed or otherwise constructed integral with drum lid 112. Where monolithically formed or otherwise constructed integral therewith, the bottom opening of fixed tube 38 can be the same opening as the tube insertion opening in drum lid 112. Where fixed tube 38 is not monolithically formed or otherwise constructed integral therewith, a separate drum lid opening may be necessarily and can be aligned with and adjacent to the bottom opening of fixed lamp tube 38 when fixed lamp tube 38 is secured to drum lid 112. A sealing member, such as a gasket, o-ring, etc. can be provided at the point when fixed lamp tube 38 is secured to drum lid 112 if tube 38 is not constructed integral with drum lid 112. The above description regarding the relationship between fixed lamp tube 38 and drum lid 112 is also applicable to the embodiment of the invention shown in FIGS. 1 through 3.

In both embodiments of the invention, motor assembly 30 can be a high speed, industrial strength motor having a shaft attached thereto and with the shaft having one or more heavy duty breaking blades secured thereto.

A tube insertion extender 130 can be provided, for either embodiment, which can be removably secured to fixed lamp tube 38. Extender 130 can be of a substantially tube-like shape and can be provided with a female receiving end 134 that fits over and receives at least an outer top portion of fixed lamp tube 38. Preferably the removable connection of extender 130 to fixed lamp tube 38 can be a sealed connection by a gasket, o-ring, other conventional sealing member. The addition of extender 130 increases safety for the individual inserting the lamps into system 10 or 100, since the point where lamp 70 is broken to the exposed opening 132 of the extender is a relatively longer distance then the top opening of tube 38, in the unlikely event broken glass shot upward into tube 38 after being broke by one or more blades of spinner assembly 36. Female receiving end 134 can be monolithically formed or otherwise constructed integral with the remaining portion of extender 130.

Alternatively, female receiving end 134 can be a separate piece from the rest of extender 130 and can be an adaptor which in use is removably connected at one end (preferably sealed connection) to fixed tube 38 and at it's opposite end to extender 130 (preferably sealed connection). Lastly, it also within the scope of the invention that the female receiving end is monolithically formed or otherwise constructed integral with fixed tube 38 and the remaining portion of extender 130 is removably secured to fixed tube 38 by a removable (and preferably sealed) insertion of extender 130 into the female receiving end 134 of fixed tube 38.

The circular opening for extender 130 and fixed tube 38 can be approximately 2.5 inches in diameter, though other diameter sizes are available and are also considered within the scope of the invention. The diameter size of receiving end/adaptor 134 can be preferably slightly larger than the diameter size of tube 38 or extender 130 to permit receiving end/adaptor 134 to function as the female portion at the connection points and tube 38 and extender 130 to serve as the male portions at their respective connection points with receiving end/adaptor 134. Fixed tube 38, receiving end/adaptor 134 and extender 130 can be constructed from any suitable metal material or any other suitable material.

A second lamp insertion opening in drum lid 112 for feeding certain shaped lamps (e.g. circline, u-shaped, other non-linear and linear shapes, etc.) through drum lid 112 can also be provided. The second opening can be substantially rectangular in shape, though other shapes can be used and are considered within the scope of the invention. Where a substantially rectangular shaped second opening is selected, a box-like member 200 can be provided on drum 112 and aligned with the second lamp insertion opening. A bottom portion of box member 200 can be pivotable between a closed position (preferably sealed) and an open position. A top portion 202 of box member can also be pivotable between a closed position (preferably sealed) and an open position. One or more connecting rods or other connecting members (all collectively referred to as "connecting rods") can be provided and are each attached at one end to the bottom portion of box member 200 and at their opposite end to top portion 202. Thus, when top portion 202 is moved to its open position by a user or other individual ("user"), the length and connection points of the connecting rods cause the bottom portion to move to its closed position (preferably sealed).

In this configuration, the user places the lamp(s) to be crushed (e.g. circline, unshaped, etc.) into box member 200 and the lamp rest on and/or is supported by the bottom portion. The. subsequent moving of top portion 202 by the user into a closed position (preferably sealed), causes the connecting rods to move the bottom portion into an open position which permits the lamp(s) previously contained within box member 202 to fall through the second lamp insertion opening in drum lid 112, where the lamp(s) is(are) met and broken and/or crushed by the one or more blades of spinner assembly 36.

The second tube insertion opening can be approximately 2" by approximately 14" in dimensions, though such is given by way of example and not considered limiting. Accordingly, other dimensions can be used and are considered within the scope of the invention. Additionally, though not limiting, certain dimensions of box member 200 can correspond to or be based from the dimensions of the second tube insertion opening of drum lid 112. Box member 200 can extend vertically approximately 14" from drum lid 112, though again, such dimension is not considered limiting and other heights can be selected and are considered within the scope of the invention.

Preferably, top portion 202 can be in a sealed closed position with respect to box member 200 and the top opening of fixed tube 38 can be sealed when system 10 or 100 is not in use. Fixed tube 38 can be sealed by a conventional plug or cap. Top portion 202 is preferably sealed by a gasket member disposed around box member 200 where it comes in contact with top portion 202 in its closed position. Other conventional sealing devices and members can be used and are considered within the scope of the invention for sealing at fixed tube 38 and/or top portion 202.

A filtering assembly 160 can be attached to drum 20 by any conventional removable or non-removable attachment manner such as but by brackets, hooks, welding, bands, etc. and all are considered within the scope of the invention. In one embodiment, filter assembly 160 can be physically supported at the top of drum 20, and preferably at drum lid 112 by a bracket member attached to or otherwise associated with outer housing 162 of assembly 160. The bracket can be a metal bracket though such is not considered limiting and other suitable materials can be used and are considered within the scope of the invention. Filter assembly 160 preferably provides multi-stage filtering through a plurality of filter members 166, 168, 170 and 172.

A hose member or other conduit 150, preferably flexible, can be attached at one end to the drum lid (to form a sealed connection) such that it is able to draw in air and mercury vapors from broken bulb(s) or lamps(s). The opposite end of hose 150 is in communication with first stage filter member 166 of multi stage filtering assembly 160. When the motor of the filter assembly is turned on, a vacuum is created (negative pressure), causing air and vapors (such as mercury vapors from broken bulbs and lamps) residing in drum 20 to travel through hose 150 and into filter assembly 160. Once passing through the series of filter members of filter assembly 160, clean and safe air is expelled out of openings in filter assembly 160, preferably, though not limiting, at the top of housing 162.

A small tube 151 on drum lid 112 can form a male member that is received by the first end of hose 150 for attached hose 150 to drum lid 112. A bracket member 163 having a hollow male member can be attached to an outer housing 162 of filter assembly 160 and aligned with an opening in filter housing 162. The hollow male member of bracket member 163 is received by the second end of hose for attaching hose 150 to outer housing 162. A small tube member 165 is attached, welded or otherwise connected to the inner wall of outer housing 162 and is aligned with the hollow male member of bracket member 163. Thus, when hose 150 is properly connected communication is provided between the interior of drum 20 and the interior area of outer housing 162. Hose 150 can be preferably connected at a position on drum lid 112 where it can be effective in capturing mercury vapors regardless of whether the lamp or bulb is inserted through fixed tube 38 or box-like member 200. Additionally, spinner assembly 36 is positioned with respect to drum lid 112 such that it is able to breach and/or crush bulbs inserted through fixed tube 38 or box-like member 200.

Thus, mercury vapors that are emitted from the broken fluorescent lamps or bulbs may be drawn out of the 55-gallon drum through hose 150 by negative pressure created by the multi-stage filtering assembly 160 that generally includes outer housing 162, high-efficiency vacuum system 164 and multiple filter members 166, 168, 170 and 172. As seen in FIG. 4, power for vacuum motor 164 can be provided by power supply 120, though other power sources are also within the scope of the invention.

The high efficiency multi-stage filtering begins with disposable collection bag 166, which is connected over small tube 165 so that communication is provided between hose 150 and collection bag 166. Bag 166 collects dry contaminated particulate such as, but not limited to, larger particles, such as pieces of broken glass and dust, that have been drawn in through hose 150 by the negative pressure created by vacuum motor 164. The second stage filtering includes an additional filter bag, such as but not limited to, a non-cling Dacron filter bag 168, which prevents particulates from entering into the additional filtering stages. Filter bag 168 can be provided as a safety in the invention the collection bag 166 is overfilled, burst, or otherwise fails to be performing properly. Furthermore, a secondary paper filter (not shown) can be provided to trap larger size particles (e.g. dust, etc.), which may escape from collection bag 166. The secondary paper filter may also extend the useful life of Dacron filter bag 168. Dacron filter bag 168 can be substantially water repellant and substantially non-clinging to shed off water, soot, and other particulates, thus, protecting HEPA filter 170 from moisture, larger dust particles, etc.

Thus, particulates, which usually are collected in bag 166, are blocked by filter bag 168 (and possibly a secondary paper filter if provided) so they don't harm or otherwise effect the performance of filters 170 and 172. Smaller particulates, air, vapor, etc. that do pass through collection bag 166 and/or filter bag 168 are drawn by the negative pressure created by vacuum motor 164 to a HEPA filter 170, which is protected by a micro impact filter 171, for extending the useful life of HEPA filter 170. Micro impact filter 171 can be in the form of a filter pad and can be composed of specially treated, high efficiency, high density, woven fiberglass designed to capture fine particles before reaching HEPA filter 170.

HEPA filter 170 is preferably provided in a housing member 173, such as, but not limited to, a substantially circular aluminum housing. The length of housing 173 can be longer then the length of HEPA filter 170 to permit micro impact filter 171 to also be housed by housing 173. HEPA filter 170 removes fine particulate from the air and vapor stream. HEPA filter 170 can be rated at 99.97% @ 0.3 micron (by the D.O.P. Test method), though other HEPA filters with different ratings (higher or lower) can be used and are considered within the scope of the invention.

After leaving HEPA filter 170, virtually only gas (air) and mercury vapor remain and continue to be drawn in by vacuum motor 164 and directed to activated carbon filter 172. Activated carbon filter 172 traps or captures the mercury vapor, while permitting the gas (air) to pass through where it is exhausted out to the environment through openings or vents 174 at the top of housing 162. Thus, activated carbon filter 172 traps, retains and/or neutralized virtually all harmful mercury vapor (toxins) to permit filter assembly 160 to exhaust clean air into the environment.

A pressure gauge 190, such as a Minometer or other differential pressure gauge, can be provided to detect potential problem with the operation of one or more components of filter assembly 160 or hose 150, as well as possible leaks. One end of a hose or other conduit or tubing 192 is connected to gauge 190. The opposite end of hose 192 is disposed with the interior of drum 20 through an opening (preferably sealed) in drum lid 112. Hose 192 can be held in place by a clip or other conventional securing member. A "low pressure" reading or other threshold reading by gauge can indicate that vacuum motor 164 is not creating the required negative pressure within drum 20 which could be caused by a leak, one of the filters or charcoal bed requiring replacement or cleaning, hose 150 being clogged, etc. Pressure gauge 190 can be mounted on top of drum lid 112 by any conventional mounting member.

Lastly, a trolly/dolly 250 ("dolly") can be provided for transporting system 10 or 100. Additionally, dolly 250 can be provided with flanges 252, which allow dolly to be maintained at an angled resting position. The angled position provides more clearance from the ceiling (i.e. low ceiling environments like on a cruise ship, etc.) for feeding lamps, especially long length lamps, into extender 130 and/or fixed tube 38. In one embodiment, the resting angle can be approximately 45 degrees. However, the invention is not considered limited to 45 degrees and any angle that provides sufficient clearance can be used and is considered within the scope of the invention. System 10 or 100 can be attached to dolly 250 by any conventional means such as straps, bands, ropes, etc.

In all embodiments, the blade or blades of the spinner assembly can be made relatively shape in order to break and crush various types of lamps and bulbs including, but not limited to, lamps and bulbs with shatterproof coatings. The various motors of the present invention can be provided with on/off switches. All references to hoses can also include other conduits such as piping, tubing, etc. The present invention is not limited to any particular shape(s) or size(s) for the lamps or bulbs.

In the preferred embodiment, drum 20 is conventional and unmodified. Thus, once drum 20 is full lid 112, with all attached components, can be removed and placed on an empty drum 20. The full drum of crushed bulbs and lamps can be labeled and removed in accordance with any relevant laws, codes, regulations, etc.

Accordingly, while there has been shown the preferred embodiment of the present invention, it is to be understood that the invention may be embodied otherwise than is herein specifically shown and described and that within said embodiments certain changes may be made in the forms and arrangements of the parts without departing from the underlying ideas or principles of this invention.

What is claimed is:

1. A fluorescent lamp collection and disposal system, said fluorescent lamp containing a hazardous material comprising:

a housing having a side wall and bottom surface defining an interior area;

a cover member having a top surface, said cover member including a tube member protruding upward from said top surface for receiving a fluorescent lamp and providing access through the cover member to the interior area of the housing for the fluorescent lamp;

means for breaking the fluorescent lamp received by said tube member into a plurality of pieces and releasing a hazardous material contained by the fluorescent lamp prior to being broken;

a hose member connected at a first end to the cover member such that the hose member is in communication with the interior area of the housing:

a multi stage filtering and vacuum assembly having a plurality of filter members and a vacuum motor, said vacuum motor positioned after a final filter of the multi stage filtering and vacuum assembly, said vacuum motor creating a negative pressure vacuum within the interior of the housing;

wherein a second end of the hose member is connected to the multi-stage filtering assembly such that the hose member is in communication with a first filter member of the multi stage filtering assembly;

wherein the negative pressure vacuum created by said vacuum motor causes at least a substantial portion of the hazardous material to be drawn through the hose member and into the multi stage filtering assembly wherein at the end of filtering by the multi-stage filtering assembly substantially hazardous material free gas is exhausted out of said multi-stage filtering assembly;

wherein at least some pieces of the plurality of pieces of the broken fluorescent lamp are retained within the interior area of said housing;

wherein said cover member further including a lamp receiving member depending upward from the top surface of the cover member, said lamp receiving member having a bottom surface, sidewalls and a top portion, wherein said top portion is connected to said bottom surface such that the movement of the top portion to an open position moves the bottom surface to a closed position for placement within said lamp receiving member of a lamp to be crushed and the movement of the top portion to a closed position moves the bottom surface to an open position to permit the placed lamp to enter the interior of the housing and for breakage by said means for breaking.

2. The fluorescent lamp collection and disposal system of claim 1 wherein said tube member is positioned substantially perpendicular with the cover member.

3. The fluorescent lamp collection and disposal system of claim 1 wherein said means for breaking is connected to the cover member and comprises:

a spinner assembly having one or more blades;

a motor assembly in communication with said spinner assembly; and means for powering said motor assembly;

wherein when said fluorescent is fed through said tube member it is broken by the one or more blades of said spinner assembly.

4. The fluorescent lamp collection and disposal system of claim 1 wherein said plurality of filters include a high efficiency particulate air filter and an activated carbon filter.

5. The fluorescent lamp collection and disposal system of claim 4 wherein said plurality of filters further includes a collection bag and a substantially non-clinging filter bag; wherein a first stage of filtering is performed by said collection bag and a last stage of filtering is performed by said activated carbon filter.

6. The fluorescent lamp collection and disposal system of claim 1 wherein said housing is a substantially 55 gallon drum.

7. The fluorescent lamp collection and disposal system of claim 6 wherein said cover member is a drum lid.

8. The fluorescent lamp collection and disposal system of claim 1 wherein said hose member is a substantially flexible vacuum hose.

9. The fluorescent lamp collection and disposal system of claim 1 wherein said hazardous material is a mercury vapor.

10. The fluorescent lamp collection and disposal system of claim 1 further including an extension member removably secured to the tube member of the cover member to extend the distance the fluorescent lamp travels prior to being broken by said means for breaking.

11. The fluorescent lamp collection and disposal system of claim 1 wherein said lamp receiving member permitting non-linear lamps to be inserted into said housing through said cover member.

12. The fluorescent lamp collection and disposal system of claim 1 further comprising a pressure gauge in communication with the interior of said housing for reading a pressure level within said housing.

13. A fluorescent lamp collection and disposal system, said fluorescent lamp containing a hazardous material comprising:

a drum having a side wall and bottom surface defining an interior area;

a cover member having a top surface, said cover member including a tube member protruding upward from said top surface for receiving a linear fluorescent lamp and providing access through the cover member to the interior area of the drum for the linear fluorescent lamp, said cover member further including a lamp receiving member depending upward from the top surface of the cover member, said lamp receiving member having a bottom surface, sidewalls and a top portion, wherein said top portion is connected to said bottom surface such that the movement of the top portion to an open position moves the bottom surface to a closed position for placement within said lamp receiving member of a non-linear lamp to be crushed and the movement of the top portion to a closed position moves the bottom surface to an open position to permit the placed non-linear lamp to enter the interior of the housing;

means for breaking a linear fluorescent lamp received by said tube member or a non-linear lamp placed within said lamp receiving member into a plurality of pieces and releasing a previously contained mercury vapor from the linear fluorescent lamp or non-linear lamp prior to being broken;

a vacuum hose connected at a first end to the cover member such that the hose member is in communication with the interior area of the housing;

a multi stage filtering and vacuum assembly having a plurality of filter members and a vacuum motor, said vacuum motor positioned after a final filter of the multi stage filtering and vacuum assembly, said vacuum motor creating a negative pressure vacuum within the interior of the housing;

wherein a second end of the hose member is connected to the multi-stage filtering assembly such that the hose member is in communication with a first filter member of the multi stage filtering assembly;

wherein the negative pressure vacuum created by said vacuum motor causes at least a substantial portion of the mercury vapor to be drawn through the hose member and into the multi stage filtering assembly wherein at the end of filtering by the multi-stage filtering assembly substantially mercury vapor free gas is exhausted out of said multi-stage filtering assembly;

wherein at least some pieces of the plurality of pieces of the broken linear fluorescent lamp or non-linear lamp are retained within the interior area of said housing.

14. The fluorescent lamp collection and disposal system of claim 13 wherein said means for breaking is connected to the drum cover and comprises:

a spinner assembly having one or more blades;

a motor assembly in communication with said spinner assembly; and means for powering said motor assembly;

wherein when said fluorescent is fed through said tube member it is broken by the one or more blades of said spinner assembly.

15. The fluorescent lamp collection and disposal system of claim 13 wherein said plurality of filters include a high efficiency particulate air filter and an activated carbon filter.

16. The fluorescent lamp collection and disposal system of claim 15 wherein said plurality of filters further includes a collection bag and a substantially non-clinging filter bag; wherein a first stage of filtering is performed by said collection bag and a last stage of filtering is performed by said activated carbon filter.

17. The fluorescent lamp collection and disposal system of claim 13 wherein said drum is a substantially 55 gallon drum.

18. The fluorescent lamp collection and disposal system of claim 13 further including an extension member removably secured to the tube member of the cover member to extend the distance the fluorescent lamp travels prior to being broken by said means for breaking.

19. The fluorescent lamp collection and disposal system of claim 13 further comprising a pressure gauge in communication with the interior of said housing for reading a pressure level within said housing.

* * * * *